(12) United States Patent
Farkas et al.

(10) Patent No.: US 9,189,791 B2
(45) Date of Patent: Nov. 17, 2015

(54) SYSTEM AND METHOD FOR PUSHING ADVERTISEMENTS

(75) Inventors: Lóráant Farkas, Budapest (HU); Balázs Bakos, Törökbálint (HU); Csaba Edvi, Györ (HU); Szabolcs Fodor, Budapest (HU); Attila Vangel, Budapest (HU)

(73) Assignee: Nokia Technologies Oy, Espoo (FI)

( * ) Notice: Subject to any disclaimer, the term of this patent is extended or adjusted under 35 U.S.C. 154(b) by 1805 days.

(21) Appl. No.: 11/562,796

(22) Filed: Nov. 22, 2006

(65) Prior Publication Data

US 2008/0119174 A1    May 22, 2008

(51) Int. Cl.
  *H04M 3/42*    (2006.01)
  *G06Q 30/02*   (2012.01)

(52) U.S. Cl.
  CPC .................................. *G06Q 30/02* (2013.01)

(58) Field of Classification Search
  CPC ..................... G06Q 30/0224; G06Q 30/0251
  USPC .......................................... 455/414.1
  See application file for complete search history.

(56) References Cited

U.S. PATENT DOCUMENTS

| | | | |
|---|---|---|---|
| 2003/0069788 A1* | 4/2003 | Han | 705/14 |
| 2006/0004627 A1 | 1/2006 | Baluja | |
| 2006/0041470 A1* | 2/2006 | Filho et al. | 705/14 |
| 2006/0064346 A1 | 3/2006 | Steenstra | |
| 2006/0064350 A1 | 3/2006 | Freer | |
| 2006/0074769 A1 | 4/2006 | Looney | |
| 2006/0085251 A1 | 4/2006 | Greene | |
| 2006/0099963 A1 | 5/2006 | Stephens | |
| 2006/0100928 A1 | 5/2006 | Walczak | |
| 2007/0061057 A1* | 3/2007 | Huang et al. | 701/23 |
| 2007/0237149 A1* | 10/2007 | Milstein et al. | 370/392 |

FOREIGN PATENT DOCUMENTS

| | | |
|---|---|---|
| WO | WO 2005/045721 A | 5/2005 |
| WO | WO 2005045721 A1 * | 5/2005 |
| WO | WO 2006/084247 A | 8/2006 |

* cited by examiner

*Primary Examiner* — Omoniyi Obayanju
(74) *Attorney, Agent, or Firm* — Ditthavong & Steiner, P.C.

(57) ABSTRACT

A server of an operator of a resource is provided that includes a processor configured for operating a service provider application, which is configured for receiving one or more advertisements that are directed to one or more advertised products or services, and are received from one or more advertising merchants. The service provider application is also configured for receiving an indication of a mobile terminal attempting to access the resource of the operator, and for pushing one or more of the received advertisements from the operator to the mobile terminal in response thereto. The advertisement(s) having been pushed to the mobile terminal for consumption thereat, the service provider application is further configured for providing a user of the mobile terminal with a discount in a cost associated with the mobile terminal accessing the resource of the operator in response to at least a partial consumption of the advertisement(s).

16 Claims, 8 Drawing Sheets

| Company name |  | Category |
| --- | --- | --- |
| mycompany |  | Golden / Silver / Brass |

| Website |  | Payment options |
| --- | --- | --- |
| www.mycompany.com |  | Credit card / Bank transfer / International Order |

Advertisement URL www.mycompany.com/adv/

☑ Data provision requested

[Submit]

FIG. 6.

SYSTEM AND METHOD FOR PUSHING ADVERTISEMENTS

FIELD OF THE INVENTION

Embodiments of the present invention generally relate to systems and methods of pushing advertisements, and more particularly, relate to systems and methods for providing targeted advertisements to users along with incentives for their consumption by the respective users.

BACKGROUND OF THE INVENTION

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. The proliferation of local, regional, and global networks such as the Internet has availed a sea of information to society. These networking technologies have expanded to increasingly include wireless and mobile technologies. Through these networks, information can be downloaded to desktop systems, wireless systems, mobile systems, etc. For example, information available via the Internet can now be downloaded onto mobile wireless devices, such as cellular telephones, personal digital assistants (PDAs), laptop computers, etc.

Second generation wireless service, often referred to as 2G wireless service, is a current wireless service based on circuit-switched technology. In this regard, 2G systems, such as Global System for Mobile communications (GSM), use digital radio technology for improved quality and a broader range of services over first generation mobile technologies. Third generation wireless service, often referred to as 3G wireless service, refers to a set of digital technologies that promises improvements in capacity, speed and efficiency by deploying new packet-based transmission methodologies between terminals and the network. Users of 3G devices and networks will have access to multimedia services such as video-on-demand, video conferencing, and fast web access and file transfer. Existing and future services are, and will continue to be, provided by network operators who make services and applications available to mobile device users via the network.

As suggested, mobile wireless devices are quickly becoming ubiquitous. Many of these wireless devices support not only telephone calls, but also e-mail and other messaging (e.g., Short Messaging Service (SMS) messaging, Multimedia Messaging Service (MMS) messaging, etc.), Web access, video/audio transmissions, games and the like. This enhanced functionality has also led to the ability to display electronic advertisements on these devices. And although techniques have been developed for generally providing advertisements to mobile wireless devices, it is typically desirable to improve existing techniques.

SUMMARY OF THE INVENTION

In view of the foregoing background, exemplary embodiments of the present invention provide a server, terminal, methods and computer program products for pushing and receiving advertisements. In accordance with exemplary embodiments of the present invention, a manufacturer or other merchant of a good or service may push an advertisement to a terminal, via an operator of a resource (e.g., private network, cellular network, etc.) accessible by the terminal. To facilitate a terminal user acquiescing to use of their terminal's resources for the consumption of advertisements in accordance with exemplary embodiments of the present invention, the operator may provide the terminal user with an incentive, such as a discount in the cost of accessing the resource, in exchange for consuming and/or pushing an advertisement.

In accordance with one aspect of the present invention, a server of an operator of a resource is provided. The server includes a processor configured for operating a service provider application that is configured for receiving one or more advertisements that are directed to one or more advertised products or services, and are received from one or more advertising merchants. The service provider application is also configured for receiving an indication of a mobile terminal attempting to access the resource of the operator, and for pushing one or more of the received advertisements from the operator to the mobile terminal in response thereto. The advertisement(s) having been pushed to the mobile terminal for consumption thereat, the service provider application is further configured for providing a user of the mobile terminal with a discount in a cost associated with the mobile terminal accessing the resource of the operator in response to at least a partial consumption of the advertisement(s).

The service provider application may be further configured for receiving feedback in response to consumption of the advertisement, where the feedback includes an indication of whether the user did or did not favor the advertisement, the respective advertising merchant and/or advertised product or service. In such instances, the service provider application may be configured for selecting one or more subsequent advertisements at least partially based upon the feedback. The service provider application may then be configured for pushing the selected advertisement(s) to the mobile terminal.

Additionally or alternatively, the service provider application may be further configured for receiving one or more preferences from the mobile terminal. These preference(s) may include, for example, one or more selected categories of products or services, and/or one or more selected merchants. The service provider application may then be configured for pushing one or more of the received advertisements to the mobile terminal in accordance with one or more of the received preferences.

Also additionally or alternatively, the service provider application may be further configured for receiving content from the mobile terminal and/or intended for the mobile terminal, where the content is received as it is transmitted across the resource of the operator. In this regard, the content may include one or more textual portions, graphical portions and/or audio portions consumable by display resources and/or speaker resources of the mobile terminal. In such instances, the service provider application may be configured for data mining the content and building a database including, from the received content, one or more textual terms or phrases, and/or one or more patterns from the graphical and/or audio portions. The database may be reflective of perceived interests of the user, and as such, the service provider application may be configured for pushing one or more of the received advertisements to the mobile terminal based upon the perceived interests of the user.

In various instances, the service provider application may be configured for pushing a plurality of advertisements to a plurality of mobile terminals. In such instances, the service provider application may be further configured for generating statistics regarding the pushed advertisements and/or the mobile terminals receiving and/or consuming the advertisements. The service provider application may then be configured for pushing one or more further advertisements, offers and/or discounts from the operator to one or more select terminals based upon the statistics.

In accordance with other aspects of the present invention, a terminal, methods and computer program products are provided for pushing and receiving advertisements. Exemplary embodiments of the present invention therefore provide a server, terminal, method and computer program product for pushing and receiving advertisements. As indicated above and explained below, exemplary embodiments of the present invention may therefore solve the problems identified by prior techniques, and/or may provide additional advantages.

BRIEF DESCRIPTION OF THE DRAWINGS

Figure 1:
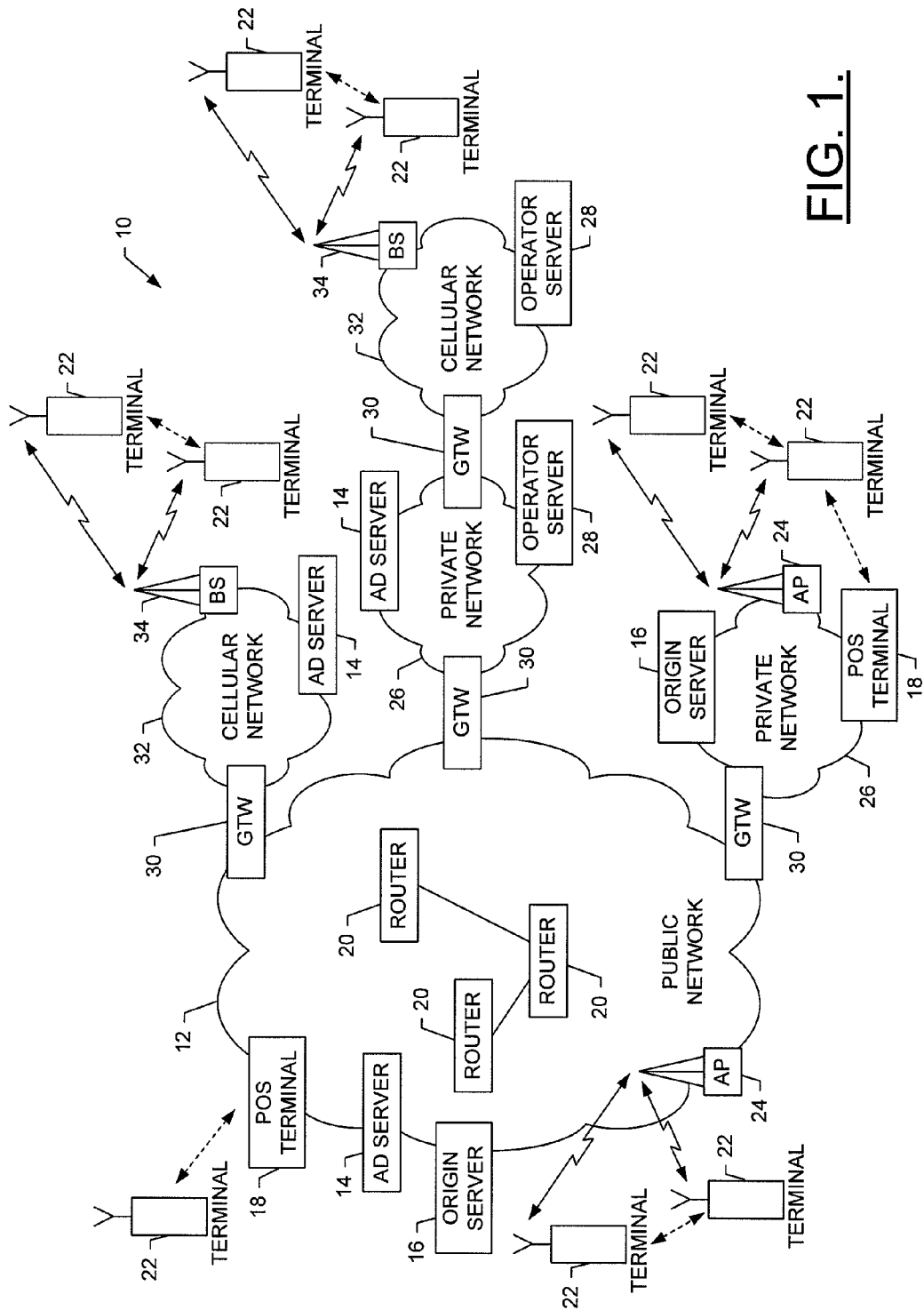
Figure 2:
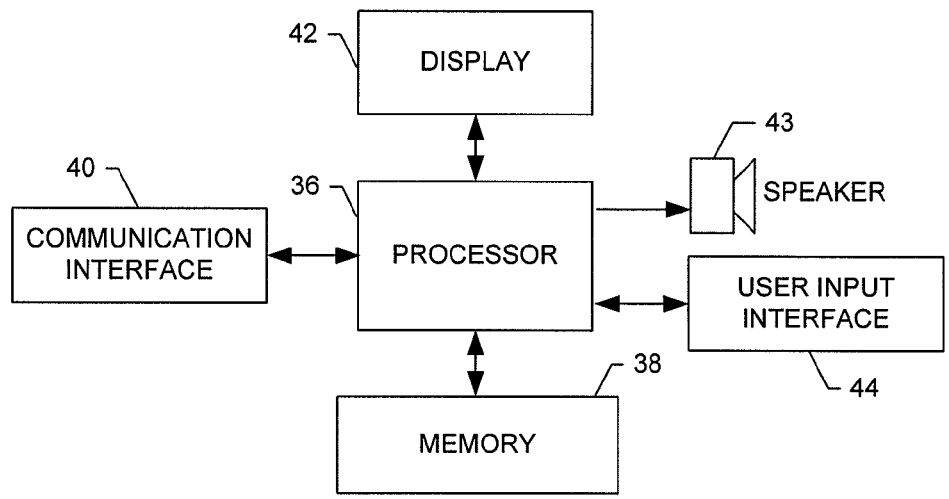
Figure 3:
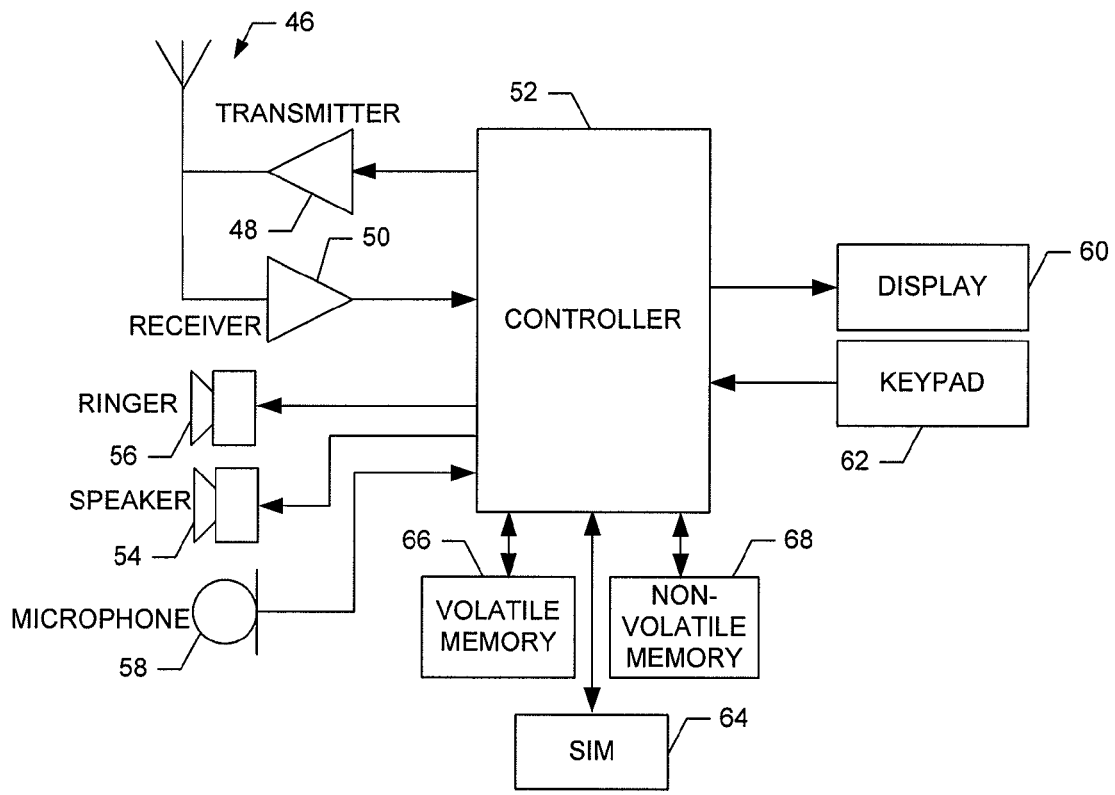
Figure 4:
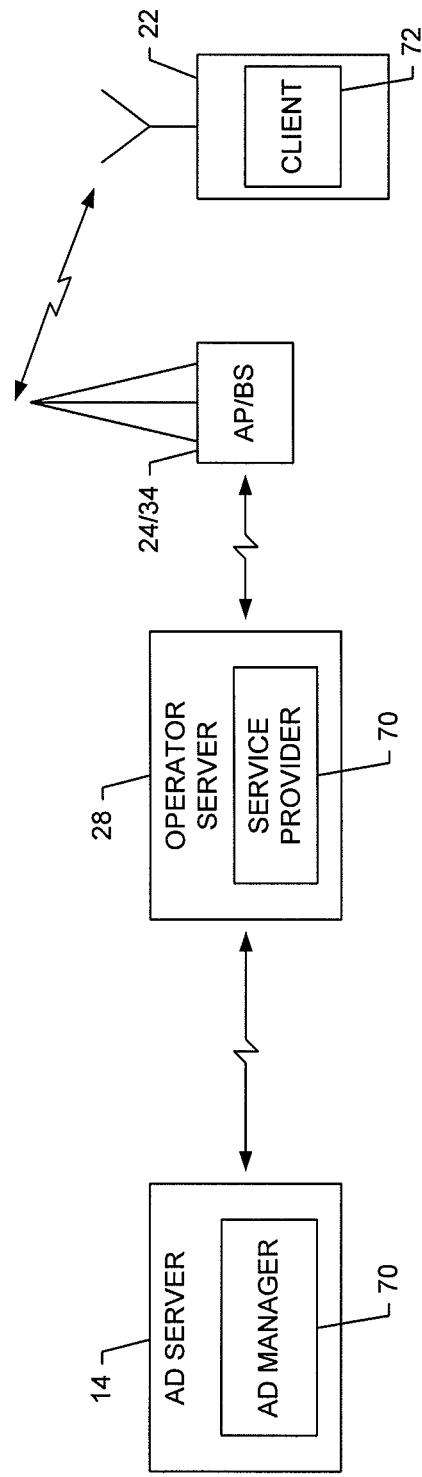
Figure 5:
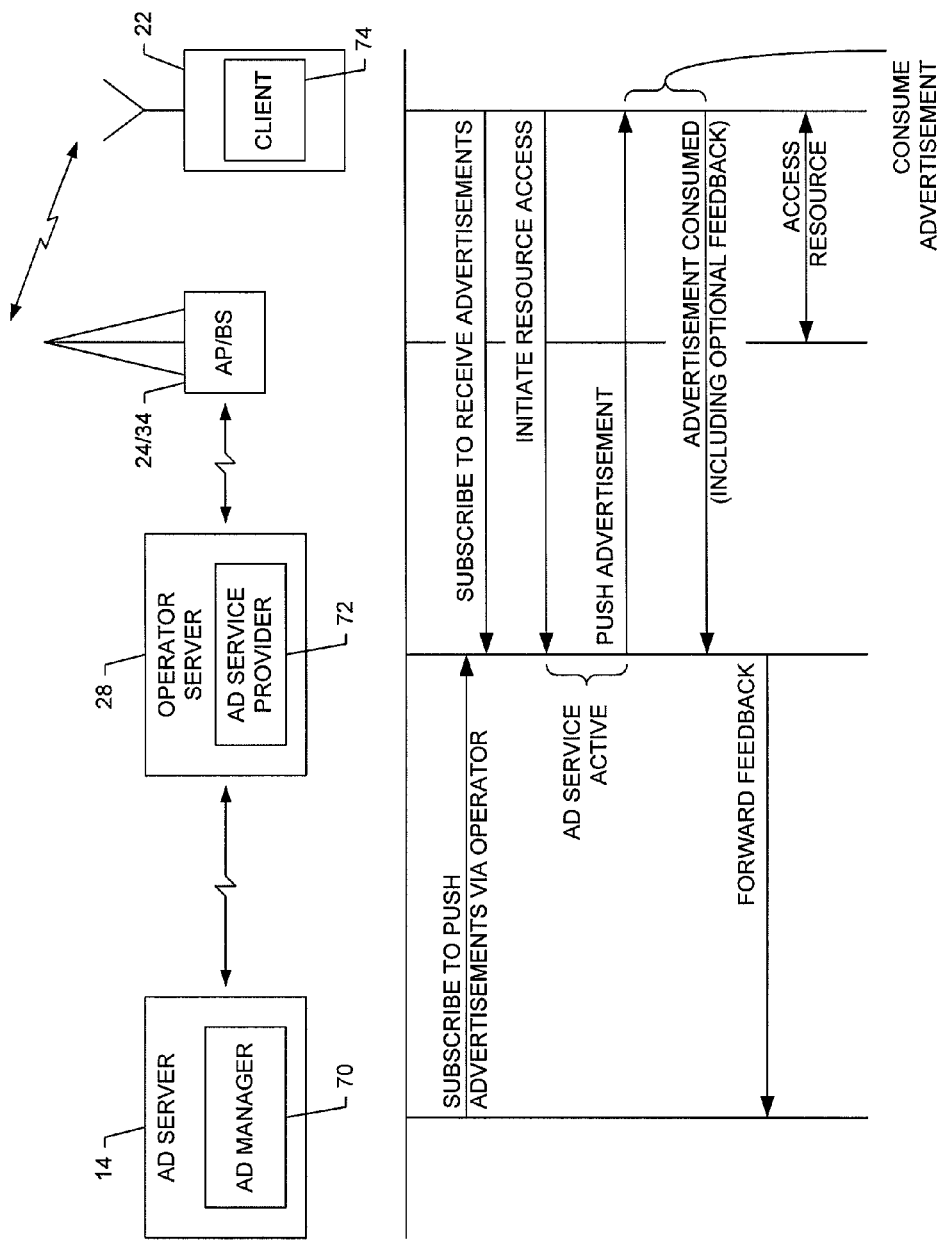
Figure 7C:
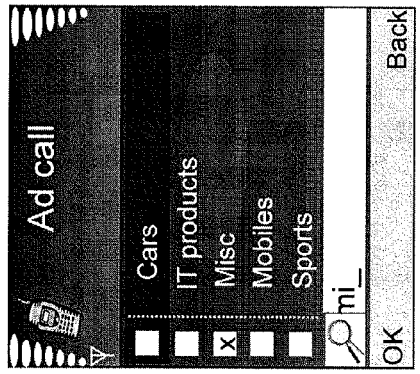
Figure 7B:
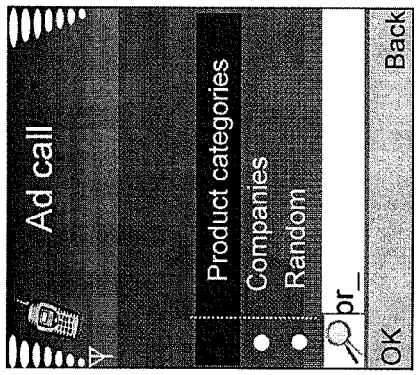
Figure 7A:
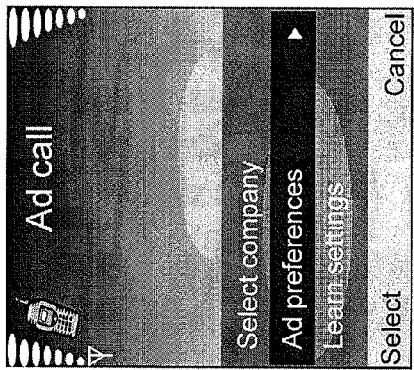
Figure 7F:
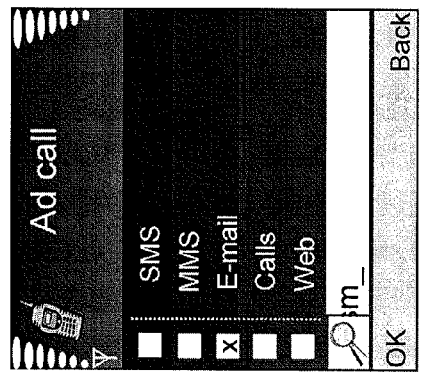
Figure 7E:
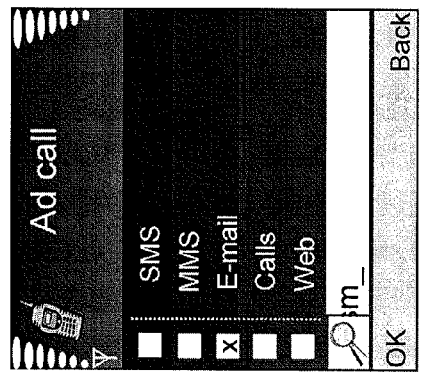
Figure 7D:
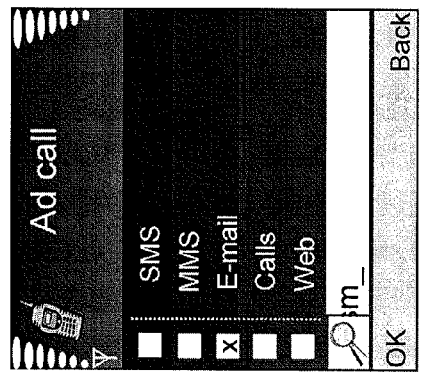
Figure 8:
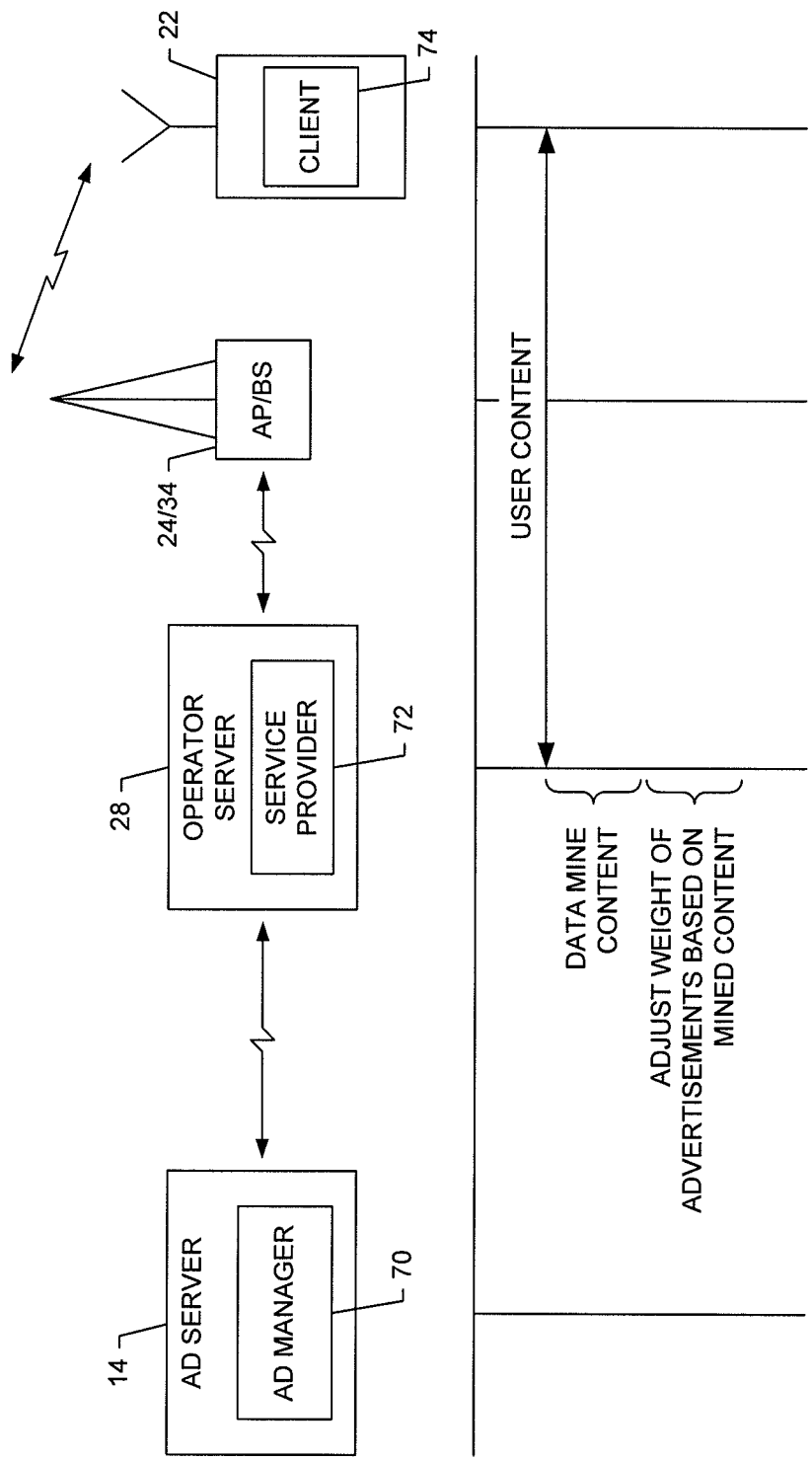
Figure 9:
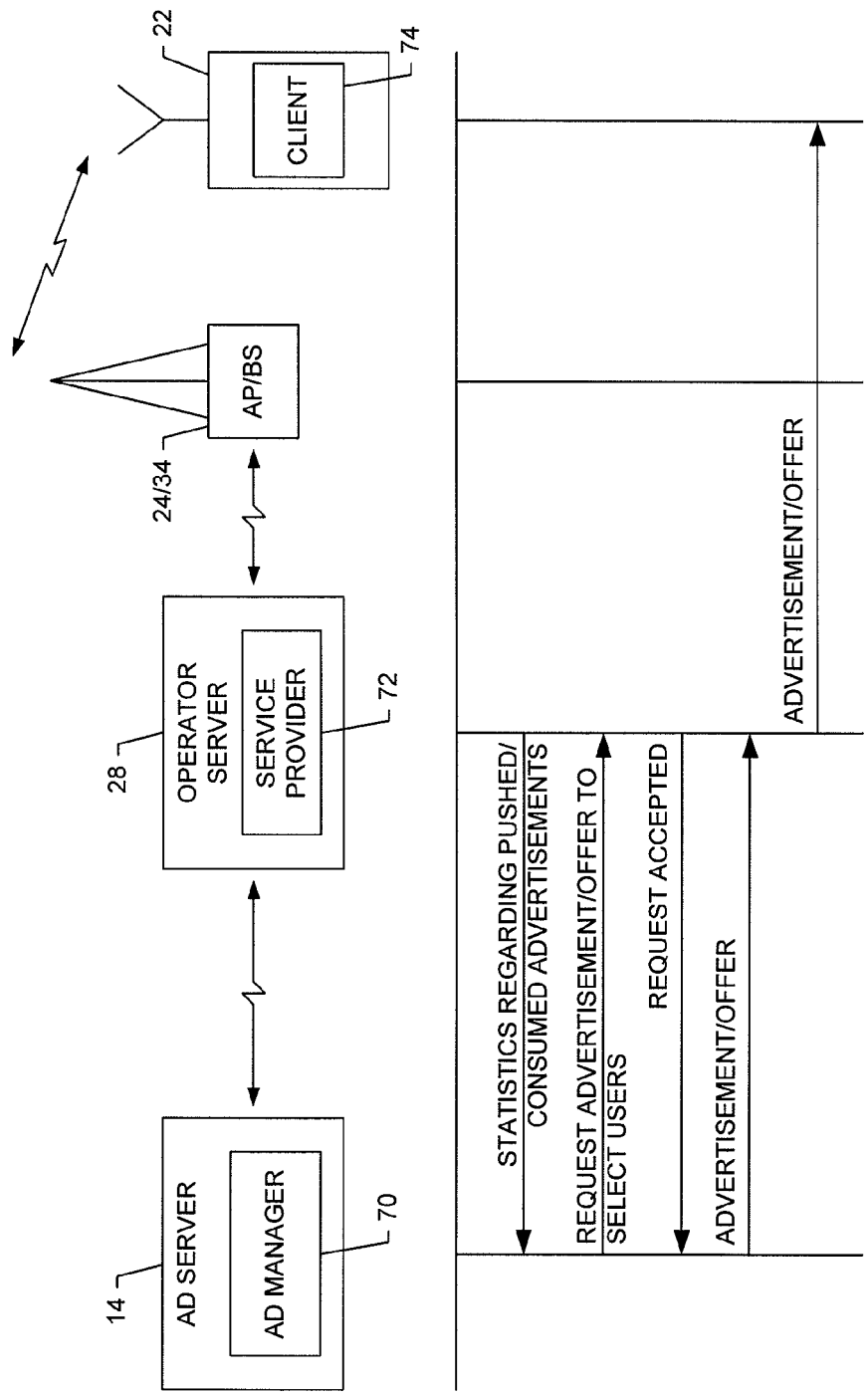

Having thus described the invention in general terms, reference will now be made to the accompanying drawings, which are not necessarily drawn to scale, and wherein:

FIG. 1 is a schematic block diagram of a system for pushing an advertisement, according to exemplary embodiments of the present invention;

FIG. 2 is a schematic block diagram of an entity configured for operating as a network node, in accordance with exemplary embodiments of the present invention;

FIG. 3 is a schematic block diagram more particularly illustrating a mobile terminal network node according to exemplary embodiments of the present invention;

FIG. 4 is a functional block diagram of a system for pushing an advertisement, in accordance with an exemplary embodiment of the present invention;

FIG. 5 is a control flow diagram of a system for pushing an advertisement, in accordance with one exemplary embodiment of the present invention;

FIG. 6 illustrates an exemplary Web portal from which a merchant may subscribe to an advertisement pushing service of an operator, in accordance with an exemplary embodiment of the present invention;

FIGS. 7a-7f illustrate exemplary displays of an exemplary portal from which a terminal user may subscribe to an advertisement pushing service of an operator, in accordance with an exemplary embodiment of the present invention FIG. 8 is a control flow diagram for data mining to select an advertisement and/or advertisement content to push to a terminal based on perceived interests of the respective terminal user, in accordance with an exemplary embodiment of the present invention; and FIG. 9 is a control flow diagram for pushing further advertisements to select terminals based on statistics regarding the pushing of advertisements to the respective terminals and consumption of the advertisements thereat, in accordance with an exemplary embodiment of the present invention.

DETAILED DESCRIPTION OF THE INVENTION

The present invention now will be described more fully hereinafter with reference to the accompanying drawings, in which exemplary embodiments of the invention are shown. This invention may, however, be embodied in many different forms and should not be construed as limited to the exemplary embodiments set forth herein; rather, these exemplary embodiments are provided so that this disclosure will be thorough and complete, and will fully convey the scope of the invention to those skilled in the art. Like numbers refer to like elements throughout.

Referring to FIG. 1, an illustration of one type of system that may benefit from embodiments of the present invention is provided. As shown, the system 10 includes a public network 12, such as a public Internet Protocol (IP) network like the Internet. The public network includes a number of network nodes, each of which typically comprise a processing element such as a server computer, router computer, personal computer, laptop computer or the like, configured for communicating within or across the public network. More particularly, the public network can include one or more network nodes comprising server processors, workstations or the like (hereinafter individually referred to as a "server.") One or more of the servers may operate as an ad server 14 or an origin server 16, as explained below. The public network can also include one or more network nodes that may operate as a point-of-sale (POS) terminal 18. Further, the public network can include a number of routers 20 through which communications are passed through the public network. In addition, the public network can include one or more network nodes comprising mobile terminals 22, each of which are configured for communicating within or across the public network.

The terminals 22 can comprise, for example, mobile telephones, portable digital assistants (PDAs), pagers, laptop computers, smart cards and other types of electronic systems. The terminals may be coupled to one or more other nodes of the public network 12, such as other terminals, POS terminals 22 or the like, and may thereby access the public network via the respective node(s). To more generally facilitate the terminals accessing the public network, the public network can include one or more wireless access points (AP's) 24, each of which can be coupled to one or more terminals. The terminals and other nodes (e.g., other terminals, POS terminals, AP's, etc.) can be configured to communicate with one another in accordance any of a number of different wireless networking techniques including, for example, wireless personal area network (WPAN) communication techniques, such as radio frequency (RF), Bluetooth (BT), infrared (IrDA) or the like, and/or wireless local area network (WLAN) communication techniques, IEEE 802.11 techniques or the like. In accordance with exemplary embodiments of the present invention, one or more terminals are configured for operating as a client to communicate with one or more other terminals, servers and/or POS terminals. It should be appreciated, however, that one or more terminals can additionally, or alternatively, be configured for operating as a server or POS terminal.

In addition to the public network 12, the system 10 can include one or more private networks 26, such as local area networks (LANs). Each private network, like the public network, can include a number of network nodes. Also, like the public network, the network nodes of one or more private networks can include one or more servers (e.g., ad servers 14, origin servers 16, etc.) and, if so desired, one or more routers (not shown). Further, the network nodes of one or more private networks can include one or more servers of operators of the respective network(s), referred to herein as operator servers 28. One or more private networks can also, like the public network, include one or more network nodes comprising one or more mobile terminals 22, each of which can be coupled to another terminal, POS terminal 18 and/or AP 24, for example. Further, to facilitate communications between network nodes of the public network and network nodes of the private networks, each private network can further include a gateway processor (GTW) 30 interconnecting the public network and the private network.

The system 10 can also include one or more mobile or cellular networks 32. The cellular networks can comprise one or more of a number of different mobile networks. In this regard, the cellular networks can comprise any of a number of first-generation (1G), second-generation (2G), 2.5G and/or third-generation (3G) cellular networks, and/or any of a number of other cellular networks configured for operating in accordance with exemplary embodiments of the present invention. For example, each cellular network can comprise a GSM (Global System for Mobile Communication), IS-136 (Time Domain Multiple Access—TDMA), IS-95 (Code Division Multiple Access—CDMA), or EDGE (Enhanced Data GSM Environment) network. Alternatively, one or more of the cellular networks can comprise GPRS (General Radio Packet Service) or GPRS-based (e.g., Universal Mobile Telecommunications System—UMTS) networks.

Like the public and private networks 12, 26, the cellular networks 24 can also include one or more network nodes. In this regard, the network modes of each cellular network can include mobile terminals configured for communicating within and/or across a respective cellular network. More particularly, the cellular networks can include one or more servers (e.g., operator servers 28, etc.) and, if so desired, routers (not shown), as with the public and private networks. In addition, the cellular networks can include one or more network nodes comprising terminals 22. To couple each terminal to the cellular network, however, the cellular network includes a base site or base station (BS) 34 (although one or more terminals may be additionally or alternatively coupled to one or more other terminals). As will be appreciated, the BS is a part of the cellular network, which can also include other elements required to operate the cellular network, such as a mobile switching center (MSC) (not shown). Similar to before, to facilitate communications between network nodes of the public and/or private networks and network nodes of the cellular networks, each cellular network can further include a GTW 30 interconnecting the cellular network and a public or private network.

Reference is now made to FIG. 2, which illustrates a block diagram of an entity configured for operating as a network node (e.g., ad server 14, origin server 16, POS terminal 18, terminal 22, operator server 28, etc.) within the public network 12, private network(s) 26 or cellular network(s) 32, in accordance with one exemplary embodiment of the present invention. Although shown as separate entities, in some exemplary embodiments, one or more entities may support one or more of the network nodes, logically separated but co-located within the entit(ies). For example, a single entity may support a logically separate, but co-located, server (e.g., ad server, origin server, operator server, etc.) and terminal. Additionally or alternatively, for example, a single entity may support a logically separate, but co-located server (e.g., ad server, origin server, operator server, etc.) and POS terminal.

The entity configured for operating as a network node includes various means for performing one or more functions in accordance with exemplary embodiments of the present invention, including those more particularly shown and described herein. It should be understood, however, that one or more of the entities may include alternative means for performing one or more like functions, without departing from the spirit and scope of the present invention. More particularly, for example, as shown in FIG. 2, the entity can include a processor 36 connected to a memory 38. The memory can comprise volatile and/or non-volatile memory, and typically stores content, data or the like. For example, the memory typically stores content transmitted from, and/or received by, the entity. Also for example, the memory typically stores software applications, instructions or the like for the processor to operate the entity in accordance with exemplary embodiments of the present invention.

In addition to the memory 38, the processor 36 can also be connected to at least one interface or other means for displaying, transmitting and/or receiving data, content or the like. In this regard, the interface(s) can include at least one communication interface 40 or other means for transmitting and/or receiving data, content or the like, as well as at least one user interface that can include a display 42, speaker 43 and/or a user input interface 44. The user input interface, in turn, can comprise any of a number of devices allowing the entity to receive data from a user, such as a keypad, a touch display, a joystick or other input device.

Reference is now made to FIG. 3, which more particularly illustrates one type of terminal 22 that would benefit from exemplary embodiments of the present invention. It should be understood, however, that the terminal illustrated and hereinafter described is merely illustrative of one type of terminal that would benefit from embodiments of the present invention and, therefore, should not be taken to limit the scope of the present invention. While several exemplary embodiments of the terminal are illustrated and will be hereinafter described for purposes of example, other types of terminals, such as those indicated above, can readily employ embodiments of the present invention.

The terminal 22 includes various means for performing one or more functions in accordance with exemplary embodiments of the present invention, including those more particularly shown and described herein. It should be understood, however, that the MN may include alternative means for performing one or more like functions, without departing from the spirit and scope of the present invention. More particularly, for example, as shown in FIG. 3, in addition to an antenna 46, the terminal may include a transmitter 48, a receiver 50, and a controller 52 or other processor that provides signals to and receives signals from the transmitter and receiver, respectively. These signals include signaling information in accordance with the air interface standard of the applicable cellular system, and also user speech and/or user generated data. In this regard, the terminal can be configured for operating with one or more air interface standards, communication protocols, modulation types, and access types. More particularly, the terminal can be configured for operating in accordance with any of a number of 1G, 2G, 2.5G and/or 3G cellular networks, and/or any of a number of other cellular networks configured for operating in accordance with exemplary embodiments of the present invention. For example, the terminal may be configured for operating in accordance with 2G wireless communication protocols GSM, IS-136 (TDMA) and/or IS-95 (CDMA). Additionally or alternatively, for example, the terminal may be configured for operating in accordance with 2.5G wireless communication protocols GPRS, EDGE or the like. Further, for example, the terminal may be configured for operating in accordance with 3G wireless communication protocols such as UMTS network.

It is understood that the controller 52 includes the circuitry required for implementing the audio and logic functions of the terminal 22. For example, the controller may be comprised of a digital signal processor device, a microprocessor device, and various analog-to-digital converters, digital-to-analog converters, and other support circuits. The control and signal processing functions of the terminal are allocated between these devices according to their respective capabilities. The controller can additionally include an internal voice coder (VC), and may include an internal data modem (DM). Further, the controller may include the functionality to operate one or more software programs, which may be stored in memory (described below). For example, the controller may be configured for operating a connectivity program, such as a conventional Web browser. The connectivity program may then allow the terminal to transmit and receive Web content, such as according to the Hypertext Transfer Protocol (HTTP) and/or the Wireless Application Protocol (WAP), for example.

The terminal 22 may also comprise a user interface including a conventional earphone or speaker 54, a ringer 56, a microphone 58, a display 60, and a user input interface, all of which are coupled to the controller 52. The user input interface, which allows the terminal to receive data, can comprise any of a number of devices allowing the terminal to receive data, such as a keypad 62, a touch display (not shown) or other input device. In exemplary embodiments including a keypad, the keypad includes the conventional numeric (0-9) and related keys (#, *), and other keys used for operating the terminal. Although not shown, the terminal can include a battery, such as a vibrating battery pack, for powering the various circuits that are required to operate the terminal, as well as optionally providing mechanical vibration as a detectable output.

Although not shown, the terminal 22 can further include one or more means for locally sharing data with one or more other network nodes, such as other terminals, POS terminals 18, AP's 24 or the like. The sharing of data, as well as the remote sharing of data, can also be provided according to a number of different wireless networking techniques, including WPAN and/or WLAN communication techniques. For example, the terminal can include a radio frequency (RF) transceiver configured for sharing data with other radio frequency transceivers, and/or with a Radio Frequency Identification (RFID) transponder tag, as such is known to those skilled in the art. Additionally, or alternatively, the terminal may include a Bluetooth transceiver for sharing data using Bluetooth brand wireless technology developed by the Bluetooth Special Interest Group. Further, for example, the terminal may share data using any of a number of different WLAN techniques such as IEEE 802.11 techniques or the like.

The terminal 22 can further include memory, such as a subscriber identity module (SIM) 64, a removable user identity module (R-UIM) or the like, which typically stores information elements related to a mobile subscriber. In addition to the SIM, the terminal can include other removable and/or fixed memory. In this regard, the terminal can include volatile memory 66, such as volatile Random Access Memory (RAM) including a cache area for the temporary storage of data. The terminal can also include other non-volatile memory 68, which can be embedded and/or may be removable. The non-volatile memory can additionally or alternatively comprise an EEPROM, flash memory or the like. The memories can store any of a number of pieces of information, and data, used by the terminal to implement the functions of the terminal. For example, the memories can store one or more identifiers, such as an international mobile equipment identification (IMEI) code, international mobile subscriber identification (IMSI) code, terminal integrated services digital network (MSISDN) code (mobile telephone number), Session Initiation Protocol (SIP) address, one or more Media Access Control (MAC) addresses or the like, configured for uniquely identifying the terminal and/or one or more components of the terminal (e.g., Bluetooth transceiver, etc.). As explained below, the memories can also store one or more software applications configured for operating on the terminal.

As explained in the background section, many mobile wireless devices support not only telephone calls, but also e-mail and other messaging (e.g., Short Messaging Service (SMS) messaging, Multimedia Messaging Service (MMS) messaging, etc.), Web access, video/audio transmissions, games and the like. This enhanced functionality has also led to the ability to display electronic advertisements on these devices. And although techniques have been developed for generally providing advertisements to mobile wireless devices, it is typically desirable to improve existing techniques.

Exemplary embodiments of the present invention therefore provide a system, terminal, method and computer program product for pushing advertisements to terminals 22 for consumption thereat. In accordance with exemplary embodiments of the present invention, a manufacturer or other merchant of a good or service may push an advertisement to a terminal via an operator (e.g., operator server 28 through an appropriate AP 24, base station 34, etc.) of a resource (e.g., private network 26, cellular network 32, etc.) accessible by the terminal, where the operator may push the merchant's advertisement as part of a fee-based service. The advertisement may be pushed to the terminal for consumption using one or more resources of the terminal including, for example, display resources (e.g., display 42, display 60, etc.), speaker resources (e.g., speaker 43, speaker 54, etc.) and/or storage resources (e.g., memory 38, volatile memory 66, non-volatile memory 68, etc.) of a terminal.

To facilitate a terminal user acquiescing to use of their terminal's resources for the consumption of advertisements in accordance with exemplary embodiments of the present invention, the terminal user may receive an incentive for consumption of the advertisement. In this regard, an incentive may be provided to a user during or after consumption of an advertisement at their respective terminal 22. The incentive may include any of a number of different entities tending to entice the terminal user into directing use of resource(s) of the terminal to consume the advertisement. For example, the incentives may include monetary benefits, such as a discount for accessing the resource (e.g., private network 26, cellular network 32, etc.) of the operator (operator server 28) via which the terminal received the advertisement. In this regard, the incentive may include a benefit provided in exchange for consuming the advertisement.

Reference is now made to FIG. 4, which illustrates a functional block diagram of an ad server 14 of a merchant pushing an advertisement to a terminal 22 via an operator server 28, the advertisement being pushed to the terminal for consumption thereat in exchange for an incentive. As shown, the ad server is configured for operating a software application, such as an ad manager 70 (e.g., conventional Web browser), for pushing the advertisement to the terminal. The operator server is configured for operating a software application, such as an ad service provider 72, for managing the pushing of advertisements from the ad managers of multiple ad servers to multiple terminals, and for providing incentives to use one or more resources of the terminals to consume the advertisements. The terminal, in turn, is configured for operating a software application, such as a client 74 for receiving the pushed advertisement, directing consumption of the advertisement by one or more resources of the terminal, and receiving incentives for the advertisement's consumption.

As shown and described herein, the ad manager 70, ad service provider 72 and client 74 comprise software generally stored and operated by the ad server 14, operator server 28 and terminal 22, respectively. It should be understood, however, that the ad manager, operator server and/or client can alternatively comprise firmware or hardware, without departing from the spirit and scope of the present invention. Also, as shown and described herein, advertisements, incentives (e.g., discounts) or the like may be pushed, disseminated, provided, downloaded, uploaded, exchanged or otherwise transferred from one network node to another network node. It should be understood, however, that the terms "pushing," "disseminating," "providing," "downloading," "uploading," "exchanging," "transferring" or the like can be used herein interchangeably, and that pushing, disseminating, providing, downloading, uploading, exchanging or transferring advertisements, incentives or the like can include, for example, moving or copying such content, without departing from the spirit and scope of the present invention.

More particularly, and with further reference to the control flow diagram FIG. 5, a method of pushing an advertisement, in accordance with one exemplary embodiment of the present invention, may include a merchant (e.g., via the ad manager 70 of an ad server 14) subscribing to a service of the service provider 70 to push one or more advertisements to one or more terminals 22. The merchant may subscribe to the service in any of a number of different manners. In one embodiment, for example, the service provider may provide a Web portal (e.g., one or more Web pages) accessible by the merchant for subscribing to the service. This Web portal may include user-input fields for receiving, from the merchant for receipt by the service provider, the merchant's name (company name) and Web site, as shown in the exemplary Web portal of FIG. 6. As also shown, the Web portal may include a field for receiving a network-addressable location (e.g., Web or IP address) to which the merchant may upload, delete or otherwise manage advertisements for pushing by the service provider. The Web portal may, for example, include a field for receiving selection of the merchant for receiving feedback from terminal users and/or statistics regarding terminal users whose terminals receive the merchant's advertisements.

Also, for example, the Web portal may include a field for receiving merchant selection of a category of service. In such instances, the service provider 72 may be configured for providing various categories of service including, for example, categories offering different probabilities of their advertisements being pushed to terminals, and/or offering different frequencies of their advertisements being pushed to terminals 22. More particularly, for example, a "golden" service category may offer a 100% probability of an advertisement's pushing to mobile terminals, whereas a "silver" service category may only offer a 75% probability of a push. The service of the service provider may generally be a fee-based service, where different categories of service may have different associated fees. Thus, the Web portal may further include one or more fields for receiving details regarding the merchant's method of payment for the service (payment options). The merchant may remit payment in any of a number of different manners and under a number of different circumstances. In this regard, payment may be made for the service provider generally pushing advertisements under a given category, but may also include a number of more sophisticated payment options. These payment options may include, for example, payment after pushing of a predetermined number of advertisements by the service provider, or after receipt of a predetermined amount of positive feedback from terminal users consuming the pushed advertisements.

Similar to the merchant, the method may also include a terminal user (e.g., via the client 74 of a terminal 22) subscribing to the service of the service provider 70 to receive one or more advertisements in exchange for incentives. The terminal user may subscribe to the service in any of a number of different manners. In one embodiment, for example, the service provider may provide a portal accessible by the terminal user for subscribing to the service. This portal may comprise one or more Web pages, elements of the standard SYMBIAN OS™ user interface or the like. Like the Web portal from which the merchant subscribed to the service, the portal from which the terminal user subscribes to the service may include user-input fields for receiving, from the terminal user for receipt by the service provider, one or more preferences for the receipt of advertisements, as shown in the exemplary portal of FIG. 7, and more particularly the portal display of FIG. 7a. In this regard, if the terminal user does not desire to receive randomly-selected advertisements, the terminal user may select one or more categories of products or services for which the user desires to receive advertisements, as shown in the exemplary portal displays of FIGS. 7b and 7c. Additionally or alternatively, the terminal user may select one or more merchants (companies) from which the user desires to receive advertisements, and may include a regularly-updated list of merchants (companies) subscribing to the service, as shown in the exemplary portal displays of FIGS. 7b and 7d.

Further, as explained below, user content (e.g., SMS, MMS, E-mail or other messages, telephone calls, Web or other IP content, etc.) transmitted to and/or from the terminal 22 through a resource of the operator 28 may be data mined and processed to determine one or more interests of the terminal user. These interests may, in turn, be utilized by the merchant and/or operator to select advertisements or tailor the content of advertisements for pushing to the terminal user based on a perceived user interest in the advertising merchant and/or the advertised product or service. And in such instances, the portal by which the terminal user subscribes to the service may further include fields for receiving preferences of the user as to the type of content (e.g., SMS, MMS, E-mail or other messages, telephone calls, Web or other IP content, etc.) the user consents to be mined by the service provider, as shown in FIGS. 7e and 7f.

Irrespective of if, and if so how, the merchant and terminal user subscribe to the service of the operator, or more particularly the service provider 72, the method may include the terminal 22 initiating access to a resource (e.g., private network 26, cellular network 32, etc.) of the operator (operator server 28). For example, the terminal may initiate access to the private network 26 of an operator, such as to access a service or resource within or across the private network. Alternatively, for example, the terminal may initiate access to the cellular network 32 of an operator, such as to place a cellular telephone call from or accept a cellular telephone call at the terminal. In such instances, the respective operator server 14, or service provider of the operator server, may determine if the terminal, or more particularly the terminal user, has subscribed to the service provider's service. If so, the service provider may push an advertisement to the terminal for consumption thereat. Before pushing the advertisement, however, the operator may invite the terminal user to receive and consume an advertisement before and/or after receiving access to the respective resource. More particularly, for example, the operator of a private or cellular network may invite the terminal user to receive and consume an advertisement before and/or after receiving access to the respective network. And in yet an even more particular example, a cellular network operator may invite the terminal user to receive and consume an audio advertisement before and/or after placing a cellular telephone call from or accepting a cellular telephone call at the terminal. In such instances, the terminal user may actively accept the invitation by providing user input to the terminal (e.g., pressing a key of the terminal's keypad) and, by extension, the respective network operator; or passively accept the invitation by failing to provide user input.

Irrespective of how receiving the advertisement is initiated, the service provider 72 may push an advertisement to the client 74, at one or more instances, such as at single instance, periodically, before/after accessing a resource, or the like. Before pushing an advertisement to the client, however, the service provider may select an advertisement for pushing to the client. The advertisement may be selected in a number of different manners. For example, the advertisement may be randomly or pseudo-randomly selected from among an available pool of advertisements of the merchant (e.g., advertisements stored at a particular network-addressable location). Alternatively, for example, the advertisement may be selected in accordance with one or more preferences of the terminal user (received during the terminal user's subscribing to the service), such as receiving advertisements for one or more categories of products or services, and/or from one or more selected merchants. Also, for example, the advertisement may be selected based upon a perceived interest of the terminal user in the advertising merchant and/or the advertised products or services. In this regard, the user's perceived interest may be determined in a number of different manners, such as tracking the location of the respective terminal (e.g., global positioning system (GPS) tracking, etc.), and/or by data mining and processing user content (e.g., SMS, MMS, E-mail or other messages, telephone calls, Web or other IP content, etc.) transmitted to and/or from the terminal 22 through a resource of the operator 28, as further explained below.

Further, the client 74 may receive the advertisement in any of a number of different forms and in any of a number of different manners. For example, the client may receive the advertisement as a textual, graphical and/or audio message via one or more messaging techniques including, for example, e-mail, SMS, MMS, voicemail or the like. Also, for example, the client may receive the advertisement, including a textual, graphical and/or audio content, in a document formatted (e.g., Hypertext Markup Language—HTML) for display in a window (e.g., popup window) of a Web browser operable by the terminal; and may receive the document in a manner for receiving such documents, such as in accordance with HTTP. Further, for example, the client may receive the advertisement as streaming text, graphics and/or audio, such as in accordance with the Real-Time Transport Protocol (RTP).

Irrespective of the form or manner of receiving the advertisement, as or after the client receives the advertisement, the client 74 may direct consumption of the advertisement by one or more resources of the terminal 22. The client may automatically direct consumption of the advertisement. In other instances, however, the client may notify the terminal user of receipt of the advertisement, such as by means of a visual and/or audio alert, so that the terminal user may direct the client to direct consumption of the advertisement at the discretion of the terminal user.

As indicated above, the advertisement may include textual, graphical and/or audio content. And as such, a number of different resources of the terminal 22 may be called upon to consume the advertisement including, for example, display resources (e.g., display 42, display 60, etc.), speaker resources (e.g., speaker 43, speaker 54, etc.) and/or storage resources (e.g., memory 38, volatile memory 66, non-volatile memory 68, etc.). More particularly, for example, the client may direct the terminal's display to present textual and/or graphical content of an e-mail, SMS, MMS or other message, alone or in combination with directing the terminal's speaker to output any audio portion of that message; or to direct the terminal's speaker to output audio content of a voicemail message. Also, for example, the client may direct the terminal's display to present a textual and/or graphical content of a document formatted for display by a Web browser, or streaming text and/or graphics, alone or in combination directing the terminal's speaker to output any audio portion of that message or streaming content. In accordance with exemplary embodiments of the present invention, the client may direct the display to present textual and/or graphical content of the advertisement in all or a portion of the display, at one or more instances of time, statically or with one or more effects (e.g., floating, blinking, etc.). In a more particular example, the client may direct the display to present textual and/or graphical content of the advertisement as a screensaver. Further, the client may direct resources of the terminal 22 directly or via a separate application for managing or otherwise directing consumption of such content (e.g., e-mail, SMS, MMS or other message viewer, voicemail player, Web browser, etc.).

In addition to or in lieu of directing consumption of the advertisement by resources such as display and/or speaker resources, the client 72 may direct storage of all or a portion of the advertisement. The stored advertisement may then be included in a selectable list of stored advertisements or other content (e.g., e-mail, SMS, MMS, voicemail or other messages, etc.) for subsequent selection by the terminal user to direct consumption thereof. In this regard, the client may subsequently further push the advertisement to other terminals 22 (one other terminal being shown as terminal 22$_2$), which may similarly include respective clients (one other client being shown as client 72$_2$), as explained further below. Also, the client may defer further consumption of the advertisement by display and/or speaker resources, such as in those instances in which the client notifies the terminal user of receipt of the advertisement and the terminal user desires to defer further consumption of the advertisement. In such instances, however, the client, service provider 72 or other entity remote from the terminal may further notify or otherwise alert the terminal user at one or more instances after storing and before further consumption of the advertisement (the service provider in appropriate circumstances being notified by the client of consumption of the advertisement, as explained below). These notifications may generally indicate the existence of a stored, but not yet consumed, advertisement; and, if so desired, may further indicate an expiration of any incentive being offered for its consumption.

Irrespective of exactly how the client 74 directs consumption of the advertisement, and how the terminal's resources consume the advertisement, after the terminal's resources consume all or a portion of the advertisement, the client may notify the service provider 72 of the advertisement consumption. In addition, if so desired, the client may receive feedback from the terminal user, which the client may forward to the service provider, and the service provider may in turn forward to the ad manager 70 of the ad server 14. The feedback may comprise any of a number of different types of feedback regarding the advertisement, the advertising merchant, and/or the advertised product or service. More particularly, for example, the feedback may comprise an indication of whether the terminal user did or did not favor the advertisement, advertising merchant, and/or advertised product/service. In this regard, the feedback may include individual feedback for the advertisement, advertising merchant and/or advertised product/service, and/or collective feedback for one or more combinations of the advertisement, advertising merchant and/or advertised product/service.

After the client 74 notifies the service provider 72 of consumption of all or a portion of the advertisement, service provider may provide, and the client may receive, an incentive for consuming the advertisement. As indicated above, an incentive may include a monetary benefit, such as a discount for accessing a resource (e.g., private network 26, cellular network 32, etc.) of the operator (operator server 28) via which the terminal received the advertisement. More particularly, for example, the incentive may include a discount for accessing a private network 26, such as to in turn access a public network 12 (e.g., Internet). Also, for example, the incentive may include a discount for accessing a cellular network 32, such as to place or accept a cellular telephone call. Further, for example, the incentive may include a discount for accessing a messaging service, such as an e-mail, SMS, MMS, voicemail or other messaging service.

Further, the benefit (e.g., discount) may have a fixed or dynamically adjustable value, and may be represented as an absolute monetary value or a relative value (e.g., percentage of the cost of a respective good or service). In this regard, the benefit may have a dynamically adjustable value based on a number of different parameters related to consumption of the advertisement. For example, the value of the benefit may increase or decrease in proportion with an amount of the terminal's resources used to consume the advertisement. More particularly, for example, the benefit value may increase or decrease in proportion to an amount of the terminal's display (e.g., display 42, display 60, etc.) used to display textual and/or graphical content of the advertisement. Also, for example, the benefit value may increase in proportion with an amount of time the terminal's resources consume the advertisement, or in proportion with an amount of the advertisement consumed by the terminal's resources. Further, for example, the benefit may have a predefined value that decreases in proportion with an amount of time between the client 74 receiving the advertisement and directing the terminal's resources to consume the advertisement.

As indicated above, the advertisement pushed to the client 74 may be selected based upon a perceived interest of the terminal user in the advertising merchant and/or the advertised product or service. And in such instances, the user's perceived interest may be determined in a number of different manners, such as tracking the location of the respective terminal (e.g., global positioning system (GPS) tracking, etc.), and/or by data mining and processing user content transmitted to and/or from the terminal 22 through a resource of the operator 28. Reference is now made to FIG. 8, which illustrates a control flow diagram for data mining to select an advertisement and/or advertisement content to push to a terminal based on perceived interests of the respective terminal user, in accordance with an exemplary embodiment of the present invention. As shown, data mining user content may include the operator, or more particularly the operator server 28, receiving user content from and/or intended for the terminal at one or, more often, a plurality of instances. In this regard, the user content may be received by the operator server as the user content passes through the operator's resource to its intended destination, whether the terminal or another destination for content transmitted from the terminal.

This user content may include content being transmitted across a resource (e.g., private network 26, cellular network 32, etc.) of the operator from the terminal or for receipt by the terminal. For example, user content may include SMS, MMS, E-mail, voicemail or other messages, voice content effectuating a telephone call, Web (e.g., HTTP, WAP, etc.) or other IP content, or the like. More generally, user content may include any of a number of different types of textual, graphical and/or audio content consumable by display (e.g., display 42, display 60, etc.) and/or speaker (e.g., speaker 43, speaker 54, etc.) resources of a terminal.

As or after the operator 28 receives user content, the operator may pass the user content to its intended destination. In addition to passing the content to its intended destination, however, the service provider 72 of the operator may data mine the content and build a database including, associated with the respective terminal, textual terms and/or phrases from textual portions of the user content, and/or patterns from graphical and/or audio portions of the user content. Additionally or alternatively, audio portions (and any graphical portions including embedded textual content) may be processed, translated, transformed or otherwise transcribed into textual content from which the database including textual terms and/or phrases may also be built. Consider, for example, an SMS message transmitted from or intended for the terminal and including the textual terms, "buy" and "shoes." The service provider may build (or continue to build) a database of terms and/or phrases, including the terms "buy" and "shoes," associating those terms and/or phrases with the terminal from which the SMS message originated, or to which the SMS message is intended.

The database of terms/phrases and/or graphical/audio patterns may be considered reflective of perceived user interests of the terminal user. In this regard, the database may include the respective terms/phrases and/or graphical/audio patterns, and further include statistics related to the respective portions of content. For example, the database may include statistics indicating a relative frequency of one or more terms/phrases and/or graphical/audio patterns appearing in user content to and/or from the respective terminal 22. Additionally or alternatively, for example, the database may include statistics indicating the location of the terminal at approximately the time the service provider 72 received the user content including one or more terms/phrases and/or graphical/audio patterns.

As the service provider 72 builds the database of terms/phrases and/or patterns, the service provider may weigh or otherwise adjust a weight of advertisements of one or more merchants based upon the database such that advertisements may be pushed to terminals based on their weights, and thus the perceived user interests of respective terminal users. More particularly, for example, the service provider may compare the terms/phrases and/or graphical/audio patterns (including any statistics associated therewith) with the terms/phrases and/or graphical/audio patterns in the advertisements of merchants, and identify any similarities between the respective portions of content, such as in accordance with any of a number of different known techniques. The service provider may weigh or otherwise adjust a weight of advertisements including portions of content having a manner of similarity with respective portions of content in the database such that those advertisements are more likely to be pushed to the respective terminal, or terminal client 74. Continuing the above example, the service provider may compare the database including the terms "buy" and "shoes" (and statistics associated therewith) to advertisements. And based on this comparison, the service provider may increase a weighting of an advertisement for shoes, and an advertisement for a clothing store located proximate the terminal at approximately the time the service provider received the SMS message including the aforementioned terms. The service provider may then push advertisements to the terminals, including the respective terminal, based on the weight of advertisements such that the shoe and store advertisements are more likely to be pushed to the client of the respective terminal.

As also suggested above, advertisements selected for pushing to a terminal 22 may be dynamically adjusted during effectuation of the service. For example, the advertisements selected for pushing to a terminal may be dynamically adjusted with adjustment of the weights of those advertisements, such as the database for the respective terminal is built. Also, for example, the advertisements selected for pushing may be dynamically adjusted based on feedback from terminal users consuming the respective advertisements. In this regard, the weight of advertisements for selection may be dynamically adjusted based on the feedback, such as by reducing the weight of those for which the terminal user did not favor the advertisement, advertising merchant, and/or advertised product/service; or the pool of advertisements for selection may be configured to exclude those respective advertisements. Similarly, the weight of advertisements for selection may be dynamically adjusted by increasing the weight of those for which the terminal user did favor the advertisement, advertising merchant, and/or advertised product/service.

Further, as the service provider 72 effectuates its service, the service provider may collect or otherwise generate statistics regarding the pushed advertisements, and/or the terminal users receiving and/or consuming the advertisements (via a respective terminal 22). These statistics may include, for example, statistics regarding the terminals more frequently receiving advertisements from a particular merchant and/or for a particular product/service, the terminals more frequently located proximate a point-of-sale of a particular merchant and/or for a particular product/service, the terminals receiving advertisements for a particular merchant to the exclusion of other merchants (e.g., as set in the user preferences), or the like. In such instances, a merchant may push (via the service provider) further advertisements, special offers and/or discounts to one or more select terminals based on one or more of those statistics, as shown in the control flow diagram of FIG. 9.

As shown in FIG. 9, the service provider 72 may forward, to the ad manager 70 of an ad server 14, statistics regarding the pushed advertisements, and/or the terminal users receiving and/or consuming the advertisements (via a respective terminal 22). In response to these statistics, the ad manager may send a request to the service provider to push a further advertisement, special offer and/or discount to one or more select terminals based on those statistics. More particularly, for example, the ad manager may send a request to the service provider to push a further advertisement, special offer and/or discount to a top percentage of terminals 22 to which the respective merchant's advertisements are being pushed and consumed. In response to the request, the service provider may send the ad manager a message accepting the request. And in response to the request (or at some other time after receiving the statistics), the ad manager may send the service provider the respective further advertisement, special offer and/or discount. Thereafter, the service provider may push the further advertisement, special offer and/or discount to the select terminals, or more particularly the clients 74 of the select terminals.

It should be noted that as the merchant (via the ad manager 70 of an ad server 14) pushes advertisements via the service provider 72, the terminal users (via the terminals 22) may be anonymous to the merchant. In this regard, the service provider may maintain the information necessary to effectuate the service, including the selection of advertisements of the merchant to push to terminals. And in those instances in which the ad manager of a merchant receives statistics regarding the terminal users, the service provider may identify the respective terminal users with identifiers unique to the respective terminal users within the service (i.e., identifiers that do not identify the respective terminal users outside of the service). These identifiers may then be associated with identifiers unique to the respective terminal users, or more particularly the respective terminals, outside the service (e.g., SMS, MMS, E-mail or other messaging address, telephone number, etc.) for pushing the respective advertisements.

According to one exemplary aspect of the present invention, the functions performed by one or more of the entities of the system, such as the ad server 14, origin server 16, terminal 22, and/or operator server 28, may be performed by various means, such as hardware and/or firmware, including those described above, alone and/or under control of a computer program product. The computer program product for performing one or more functions of exemplary embodiments of the present invention includes a computer-readable storage medium, such as the non-volatile storage medium, and software (e.g., ad manager 70, service provider 72, client 74, etc.) including computer-readable program code portions, such as a series of computer instructions, stored in the computer-readable storage medium.

In this regard, FIGS. 4, 5, 8 and 9 are a functional block diagram and control flow diagrams of systems, methods and program products according to exemplary embodiments of the present invention. It will be understood that each block or step of the functional block diagram and control flow diagrams, and combinations of blocks in the functional block diagram and control flow diagrams, can be implemented by various means, such as hardware, firmware, and/or software including one or more computer program instructions. As will be appreciated, any such computer program instructions may be loaded onto a computer or other programmable apparatus (i.e., hardware) to produce a machine, such that the instructions which execute on the computer or other programmable apparatus create means for implementing the functions specified in the functional block diagrams' and flowchart's block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the functional block diagrams' and flowchart's block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the functional block diagram's and control flow diagrams' block(s) or step(s).

Accordingly, blocks or steps of the functional block diagram and control flow diagrams support combinations of means for performing the specified functions, combinations of steps for performing the specified functions and program instruction means for performing the specified functions. It will also be understood that one or more blocks or steps of the functional block diagram and control flow diagrams, and combinations of blocks or steps in the functional block diagram and control flow diagrams, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific exemplary embodiments disclosed and that modifications and other embodiments are intended to be included within the scope of the appended claims. Although specific terms are employed herein, they are used in a generic and descriptive sense only and not for purposes of limitation.

What is claimed is:

1. A method comprising:
accessing an access network of an operator by an apparatus;
subscribing via the apparatus to receive one or more advertisements and to be data-mined via selected one or more fields displayed on a user interface, at least one of the selected one or more fields indicating one or more user communication types to be data-mined by the operator, wherein content in the one or more user communication types is subject to data-mining when transmitted to and from the apparatus;
receiving the one or more advertisements as subscribed from the operator at the apparatus, the advertisements being directed to one or more advertised products or services;
at least partially consuming the subscribed advertisements such that a user of the apparatus or another apparatus receives a discount in a cost associated with accessing the access network of the operator,
wherein at least one other of the selected fields indicates an advertised product category, advertised service category, advertising merchant, or a combination thereof, and
at least another one of the selected fields indicates one or more data-mined preferences for the content received via the access network, the one or more data-mined preferences include at least one of one or more selected categories of products or services, one or more selected merchants, or a combination thereof, and
causing a sending to the operator information of a physical location of the apparatus;
causing a sending, from the apparatus, of feedback in response to partial consumption of the subscribed advertisements, the feedback on at least one of the subscribed advertisements, the respective advertising merchant or advertised product or service; and
receiving other one or more of the subscribed advertisements at the apparatus from the operator, the other one or more of the subscribed advertisements in response to at least partially at least one of the feedback and the location physical location of the apparatus,
wherein the user of the apparatus or the another apparatus remains anonymous to the advertising merchants.

2. A method according to claim 1, wherein the one or more user communication types include short message service, multimedia messaging service, email, telephone call, Web, or a combination thereof.

3. An apparatus comprising:
at least one processor; and
at least one memory including computer program code, the at least one memory and the computer program code configured to, with the at least one processor, cause the apparatus to perform at least the following,
attempt to access an access network of an operator by interacting with a user interface of an access portal of the access network;
subscribe via the user interface to receive one or more advertisements and to be data-mined via selected one or more fields displayed on the user interface, at least one of the selected one or more fields indicating one or more user communication types to be data-mined by the operator, thereby gaining access to the access network;
access the access network after completing the subscription,
wherein content in the one or more user communication types is subject to data-mining when transmitted to and from the apparatus through a resource of the operator,
receive the one or more advertisements as subscribed from the operator at the apparatus, the advertisements being directed to one or more advertised products or services, and having been received at the operator from one or more advertising merchants;
wherein at least one other of the selected fields indicates an advertised product category, advertised service category, advertising merchant, or a combination thereof,
at least another one of the selected fields indicates one or more data-mined preferences from the content transmitted via the access network, the one or more data-mined preferences include at least one of one or more selected categories of products or services, one or more selected merchants, or a combination thereof, and
the one or more user communication types include short message service, multimedia messaging service, email, telephone call, Web, or a combination thereof, and
send to the operator information of a physical location of the apparatus; and
send feedback in response to a partial consumption of the subscribed advertisements, the feedback including an indication of whether the user did or did not favor at least one of the subscribed advertisements, the respective advertising merchant or advertised product or service; and
receive other one or more of the subscribed advertisements at the apparatus from the operator, the other one or more of the subscribed advertisements having been selected at the operator at least partially based upon at least one of the feedback and the location physical location of the apparatus, and
wherein the user of the apparatus or the another apparatus remains anonymous to the advertising merchants.

4. An apparatus according to claim 3, wherein the apparatus is further caused to:
receive via the user interface at the apparatus or at another apparatus user consent to send to the operator and the advertising merchants information of at least one of the advertisement subscription, the feedback, the location physical location of the apparatus, the one or more user communication types to be data-mined by the operator, and the one or more data-mined preferences, and
wherein the one or more subscribed advertisements are adjusted by the operator and the advertising merchants for the apparatus in accordance with the information.

5. A non-transitory computer-readable storage medium carrying one or more sequences of one or more instructions which, when executed by one or more processors, cause an apparatus to at least perform the following steps:
attempting to access an access network of an operator by interacting with a user interface of an access portal of the access network;
subscribing via the user interface to receive one or more advertisements and to be data-mined via selected one or more fields displayed on the user interface, at least one of the selected one or more fields indicating one or more user communication types to be data-mined by the operator, thereby gaining access to the access network; and accessing the access network after completing the subscription, wherein content in the one or more user communication types is subject to data-mining when transmitted to and from the apparatus through a resource of the operator, receiving the one or more advertisements as subscribed from the operator at the apparatus, the advertisements being directed to one or more advertised products or services, and having been received at the operator from one or more advertising merchants, wherein at least one other of the selected fields indicates an advertised product category, advertised service category, advertising merchant, or a combination thereof, at least another one of the selected fields indicates one or more data-mined preferences from the content transmitted via the access network, the one or more data-mined preferences include at least one of one or more selected categories of products or services, one or more selected merchants, or a combination thereof, and the one or more user communication types include short message service, multimedia messaging service, email, telephone call, Web, or a combination thereof;

causing a sending to the operator of information of a physical location of the apparatus;

causing a sending of feedback in response to a partial consumption of the subscribed advertisements, the feedback including an indication of whether the user did or did not favor at least one of the subscribed advertisements, the respective advertising merchant or advertised product or service; and receiving other one or more of the subscribed advertisements at the apparatus from the operator, the other one or more of the subscribed advertisements having been selected at the operator at least partially based upon at least one of the feedback and the location physical location of the apparatus, wherein the user of the apparatus or the another apparatus remains anonymous to the advertising merchants.

6. A non-transitory computer-readable storage medium according to claim 5, wherein the apparatus is caused to further perform:

receiving at the apparatus or at another apparatus user consent to send to the operator and the advertising merchants information of at least one of the advertisement subscription, the feedback, the physical location of the apparatus, the one or more user communication types to be data-mined by the operator, and the one or more data-mined preferences, and wherein the one or more subscribed advertisements are adjusted by the operator and the advertising merchants for the apparatus in accordance with the information.

7. A method comprising:

receiving one or more advertisements directed to one or more advertised products or services from one or more advertising merchants at a server;

receiving an indication of a mobile terminal attempt to access an access network of an operator of the server;

receiving from the mobile terminal a subscription to one or more of the advertisements and to be data-mined via one or more user communication types to be data-mined by the operator; and accepting a subscription of the mobile terminal and granting the mobile terminal access to the access network, wherein content in the one or more user communication types is subject to data-mining when transmitted to and from the apparatus through a resource of the operator;

causing a pushing of the subscribed one or more advertisements to the mobile terminal for consumption thereat;

in response to at least partial consumption of the one or more subscribed advertisements at the mobile terminal, providing a user of the mobile terminal or another apparatus with a discount in a cost associated with accessing the access network of the operator, wherein the subscription indicates an advertised product category, advertised service category, advertising merchant, or a combination thereof, wherein the subscription indicates one or more data-mined preferences from the content transmitted via the access network, the one or more data-mined preferences include at least one of one or more categories of products or services, the one or more selected advertising merchants, or a combination thereof, and the one or more user communication types include short message service, multimedia messaging service, email, telephone call, Web, or a combination thereof, receiving information of a physical location of the mobile terminal;

receiving feedback in response to partial consumption of the subscribed advertisements, the feedback on at least one of the subscribed advertisements, the respective advertising merchant or advertised product or service; and sending other one or more of the subscribed advertisements, the other one or more of the subscribed advertisements having been selected at the operator at least partially based upon at least one of the feedback and the location physical location of the mobile terminal, wherein the user of the mobile terminal or the another apparatus remains anonymous to the one or more advertising merchants.

8. A method according to claim 7, further comprising:

receiving, at the operator, the content from the mobile terminal or intended for the mobile terminal, to be transmitted across the access network of the operator, and the content including one or more textual portions, one or more graphical portions, one or more audio portions, or a combination thereof, consumable by at least one of display resources or speaker resources of the mobile terminal;

data mining the content; and building a database of user interests, at the operator, from data-mined content including one or more textual terms or phrases, one or more patterns, or a combination thereof, from at least one of the portions; and wherein pushing the subscribed advertisements comprises pushing one or more of the subscribed advertisements to the mobile terminal based upon the user interests.

9. A method according to claim 7, wherein pushing the subscribed advertisements comprises pushing a plurality of subscribed advertisements from the operator to a plurality of mobile terminals, and wherein the method further comprises:

generating, at the operator, statistics regarding at least one of the pushed advertisements or the mobile terminals receiving or consuming the pushed advertisements, wherein the statistics include data mined via the one or more user communication types by the operator based at least in part on the one or more data-mined preferences; and pushing one or more further advertisements, offers or discounts from the operator to one or more of the mobile terminals based upon the statistics.

10. An apparatus comprising:
at least one processor; and
at least one memory including computer program code,
the at least one memory and the computer program code configured to, with the at least one processor, cause the apparatus to perform at least the following,
receive one or more advertisements directed to one or more advertised products or services from one or more advertising merchants at a server;
receive an indication of a mobile terminal attempt to access an access network of an operator of the server;
receive from the mobile terminal a subscription to one or more of the advertisements and to be data-mined via one or more user communication types by the operator;
accept the subscription of the mobile terminal and grant the mobile terminal access to the access network,
wherein content in the one or more user communication types is subject to data-mining when transmitted to and received from the apparatus through a resource of the operator,
push the subscribed one or more advertisements to the mobile terminal for consumption thereat;
in response to at least partial consumption of the one or more subscribed advertisements at the mobile terminal, provide a user of the mobile terminal or another apparatus with a discount in a cost associated with accessing the access network of the operator,
wherein the subscription indicates an advertised product category, advertised service category, advertising merchant, or a combination thereof,
wherein the subscription indicates one or more data-mined preferences from the content transmitted via the access network, the one or more data-mined preferences include at least one of one or more categories of products or services, the one or more selected advertising merchants, or a combination thereof, and
the one or more user communication types include short message service, multimedia messaging service, email, telephone call, Web, or a combination thereof,
receive information of a physical location of the mobile terminal;
receive feedback in response to partial consumption of the subscribed advertisements, the feedback on at least one of the subscribed advertisements, the respective advertising merchant or advertised product or service; and
send other one or more of the subscribed advertisements, the other one or more of the subscribed advertisements having been selected at the operator at least partially based upon at least one of the feedback and the location physical location of the mobile terminal, wherein the user of the mobile terminal or the another apparatus remains anonymous to the one or more advertising merchants.

11. An apparatus according to claim 10, wherein the apparatus is further caused to:
receive the content from the mobile terminal, and the content including one or more textual portions, one or more graphical portions, one or more audio portions, or a combination thereof, consumable by at least one of display resources or speaker resources of the mobile terminal;
data-mine the content; and
build a database of user interests, at the operator, from data-mined content including one or more textual terms or phrases, one or more patterns, or a combination thereof, from at least one of the portions,
wherein pushing the subscribed advertisements comprises pushing one or more of the subscribed advertisements to the mobile terminal based upon the user interests.

12. An apparatus according to claim 10, wherein a plurality of subscribed advertisements are pushed to a plurality of mobile terminals, and the apparatus is further caused to:
generate statistics regarding at least one of the pushed advertisements or the mobile terminals receiving or consuming the pushed advertisements, wherein the statistics include data mined via the one or more user communication types by the operator based at least in part on the one or more data-mined preferences; and
push one or more further advertisements, offers or discounts from the operator to one or more of the mobile terminals based upon the statistics.

13. A method according to claim 12, the apparatus further caused to:
receive user-consented information of at least one of the advertisement subscription, the feedback, the location physical location of the apparatus, the one or more user communication types to be data-mined by the operator, and the one or more data-mined preferences, and
wherein the one or more subscribed advertisements are adjusted by the operator and the advertising merchants for the apparatus in accordance with the information.

14. A non-transitory computer-readable storage medium carrying one or more sequences of one or more instructions which, when executed by one or more processors, cause an apparatus to at least perform the following steps:
receiving one or more advertisements directed to one or more advertised products or services from one or more advertising merchants at a server;
receiving an indication of a mobile terminal attempt to access an access network of an operator of the server;
receiving from the mobile terminal a subscription to one or more of the advertisements and to be data-mined via one or more user communication types by the operator;
accepting the subscription of the mobile terminal and granting the mobile terminal access to the access network,
wherein content in the one or more user communication types is subject to data-mining when transmitted to and received from the apparatus through a resource of the operator,
causing a pushing of the subscribed one or more advertisements to the mobile terminal for consumption thereat;
in response to at least partial consumption of the subscribed one or more advertisements at the mobile terminal, providing a user of the mobile terminal or another apparatus with a discount in a cost associated with accessing the access network of the operator,
wherein the subscription indicates an advertised product category, advertised service category, advertising merchant, or a combination thereof,
at least another one of the selected fields indicates one or more data-mined preferences from the content transmitted via the access network, the one or more data-mined preferences include at least one of one or more categories of products or services, the one or more selected advertising merchants, or a combination thereof, and
the one or more user communication types include short message service, multimedia messaging service, email, telephone call, Web, or a combination,
receiving information of a physical location of the mobile terminal;

receiving feedback in response to partial consumption of the subscribed advertisements, the feedback on at least one of the subscribed advertisements, the respective advertising merchant or advertised product or service; and causing a sending other one or more of the subscribed advertisements, the other one or more of the subscribed advertisements having been selected at the operator at least partially based upon at least one of the feedback and the location physical location of the mobile terminal, wherein the user of the mobile terminal or the another apparatus remains anonymous to the one or more advertising merchants.

15. A non-transitory computer-readable storage medium according to claim 14, wherein the apparatus is caused to further perform:

receiving the content from the mobile terminal or intended for the mobile terminal, to be transmitted across the access network of the operator, and the content including one or more textual portions, one or more graphical portions, one or more audio portions, or a combination thereof, consumable by at least one of display resources or speaker resources of the mobile terminal;

data mining the content; and building a database of user interests, at the operator, from data-mined content including one or more textual terms or phrases, one or more patterns, or a combination thereof, from at least one of the portions; and wherein pushing the subscribed advertisements comprises pushing one or more of the subscribed advertisements to the mobile terminal based upon the user interests.

16. A non-transitory computer-readable storage medium according to claim 14, wherein pushing the subscribed advertisements comprises pushing a plurality of subscribed advertisements from the operator to a plurality of mobile terminals, and wherein the apparatus is caused to further perform:

generating, at the operator, statistics regarding at least one of the pushed advertisements or the mobile terminals receiving or consuming the pushed advertisements, wherein the statistics include data mined via the one or more user communication types by the operator based at least in part on the one or more data-mined preferences; and pushing one or more further advertisements, offers or discounts from the operator to one or more of the mobile terminals based upon the statistics.

* * * * *